(12) United States Patent
Lakey (10) Patent No.: US 12,525,142 B2
(45) Date of Patent: Jan. 13, 2026

(54) X-SQUARED MATH CARD GAME

(71) Applicant: Peter Lakey, Webster Groves, MO (US)

(72) Inventor: Peter Lakey, Webster Groves, MO (US)

( * ) Notice: Subject to any disclaimer, the term of this patent is extended or adjusted under 35 U.S.C. 154(b) by 890 days.

(21) Appl. No.: 17/745,794

(22) Filed: May 16, 2022

(65) Prior Publication Data

US 2023/0368697 A1    Nov. 16, 2023

(51) Int. Cl.
| | | |
|---|---|---|
| *G09B 19/02* | (2006.01) | |
| *A63F 1/04* | (2006.01) | |
| *G09B 1/32* | (2006.01) | |
| *A63F 1/00* | (2006.01) | |

(52) U.S. Cl.
CPC ............... *G09B 19/02* (2013.01); *A63F 1/04* (2013.01); *G09B 1/32* (2013.01); *A63F 2001/005* (2013.01); *A63F 2001/0416* (2013.01)

(58) Field of Classification Search
CPC ................................ G09B 19/22; G09B 23/02
USPC ........................................................ 273/302
See application file for complete search history.

(56) References Cited

U.S. PATENT DOCUMENTS

| | | | | | |
|---|---|---|---|---|---|
| 1,843,183 | A * | 2/1932 | Thompson | ............... | G09B 3/08 |
| | | | | | D18/26 |
| 4,281,835 | A * | 8/1981 | Seiden | .................. | A63F 9/0098 |
| | | | | | 273/299 |
| 4,379,700 | A * | 4/1983 | Pollock | .................. | G09B 19/02 |
| | | | | | 273/299 |
| 5,603,501 | A * | 2/1997 | Hayes | .................. | A63F 3/0415 |
| | | | | | 273/272 |
| 5,868,393 | A * | 2/1999 | Williams | .................. | A63F 1/00 |
| | | | | | 273/299 |
| 5,906,492 | A * | 5/1999 | Putterman | ............ | G09B 17/006 |
| | | | | | 434/167 |
| 6,648,648 | B1 * | 11/2003 | O'Connell | ............. | G09B 19/02 |
| | | | | | 273/431 |
| 6,676,414 | B1 * | 1/2004 | MacHendrie | .......... | G09B 19/02 |
| | | | | | 434/191 |
| 7,220,126 | B2 * | 5/2007 | Glymph | ................. | G09B 19/02 |
| | | | | | 434/129 |
| 7,367,564 | B2 * | 5/2008 | Latell | ........................ | A63F 1/04 |
| | | | | | 273/272 |
| 8,567,787 | B1 * | 10/2013 | Chang | ........................ | A63F 1/00 |
| | | | | | 273/299 |
| 2010/0052256 | A1 * | 3/2010 | Kumar | ....................... | A63F 1/04 |
| | | | | | 273/302 |

(Continued)

*Primary Examiner* — Kurt Fernstrom (57) ABSTRACT

X-Squared is a unique mathematical card deck and methods for using the deck to play games. This invention fills a large gap in the market for educational games by including physical cards for operands as well as exponents and parentheses. No card game in the public domain contains all of the elements of the Order of Operations (aka PEMDAS). X-Squared does include all of the requisite operators: Parentheses, Exponent, Multiplication, Division, Addition and Subtraction. The card deck has utility for both educational and entertainment purposes. By playing variations of the game as specified, students will gain a richer understanding of mathematical operations. For the general public, the variety of games that may be played (including poker) will bring much enjoyment to those who engage with the X-Squared Card Deck.

1 Claim, 8 Drawing Sheets

Playing Card Types (56) References Cited

U.S. PATENT DOCUMENTS

| | | | |
|---|---|---|---|
| 2013/0020766 A1* | 1/2013 | Coleman | G09B 19/02 |
| | | | 273/302 |
| 2013/0241151 A1* | 9/2013 | McAndrew | A63F 1/02 |
| | | | 273/292 |
| 2019/0096282 A1* | 3/2019 | Hotchkiss | G09B 19/22 |
| 2020/0312186 A1* | 10/2020 | Ben Nun | G09B 19/02 |

* cited by examiner

FIG. 1. Playing Card Types

FIG. 2. Integer Card Faces

FIG. 3. Operator Card Faces

FIG. 4. Parenthesis and Exponent Cards (transparent)

FIG. 5. Solution Card Faces

| | | | |
|---|---|---|---|
| $(0+0+9)^2$ | $(2+2+5)^2$ | $(4-3+8)^2$ | $(7-6+8)^2$ |
| $(0+1+8)^2$ | $(2+3+4)^2$ | $(4-4+9)^2$ | $(7-7+9)^2$ |
| $(0+2+7)^2$ | $(2-0+7)^2$ | $(4 \times 4-7)^2$ | $(7 \div 1+2)^2$ |
| $(0+3+6)^2$ | $(2-1+8)^2$ | $(4 \div 1+5)^2$ | $(7 \div 7+8)^2$ |
| $(0+4+5)^2$ | $(2-2+9)^2$ | $(4 \div 2+7)^2$ | $(8+8-7)^2$ |
| $(0 \times 1+9)^2$ | $(2 \times 0+9)^2$ | $(4 \div 4+8)^2$ | $(8+9-8)^2$ |
| $(0 \times 2+9)^2$ | $(2 \times 1+7)^2$ | $(5+5-1)^2$ | $(8-0+1)^2$ |
| $(0 \times 3+9)^2$ | $(2 \times 2+5)^2$ | $(5+6-2)^2$ | $(8-1+2)^2$ |
| $(0 \times 4+9)^2$ | $(2 \times 3+3)^2$ | $(5+7-3)^2$ | $(8-2+3)^2$ |
| $(0 \times 5+9)^2$ | $(2 \times 4+1)^2$ | $(5+8-4)^2$ | $(8-3+4)^2$ |
| $(0 \times 6+9)^2$ | $(2 \times 5-1)^2$ | $(5+9-5)^2$ | $(8-4+5)^2$ |
| $(0 \times 7+9)^2$ | $(2 \times 6-3)^2$ | $(5-0+4)^2$ | $(8-5+6)^2$ |
| $(0 \times 8+9)^2$ | $(2 \times 7-5)^2$ | $(5-1+5)^2$ | $(8-6+7)^2$ |
| $(0 \times 9+9)^2$ | $(2 \times 8-7)^2$ | $(5-2+6)^2$ | $(8-7+8)^2$ |
| $(0 \div 1+9)^2$ | $(2 \times 9-9)^2$ | $(5-3+7)^2$ | $(8-8+9)^2$ |
| $(0 \div 2+9)^2$ | $(2 \div 1+7)^2$ | $(5-4+8)^2$ | $(8 \div 1+1)^2$ |
| $(0 \div 3+9)^2$ | $(2 \div 2+8)^2$ | $(5-5+9)^2$ | $(8 \div 8+8)^2$ |
| $(0 \div 4+9)^2$ | $(3+0+6)^2$ | $(5 \div 1+4)^2$ | $(9+9-9)^2$ |
| $(0 \div 5+9)^2$ | $(3+1+5)^2$ | $(5 \div 5+8)^2$ | $(9-0+0)^2$ |
| $(0 \div 6+9)^2$ | $(3+2+4)^2$ | $(6+6-3)^2$ | $(9-1+1)^2$ |
| $(0 \div 7+9)^2$ | $(3+3+3)^2$ | $(6+7-4)^2$ | $(9-2+2)^2$ |
| $(0 \div 8+9)^2$ | $(3-0+6)^2$ | $(6+8-5)^2$ | $(9-3+3)^2$ |
| $(0 \div 9+9)^2$ | $(3-1+7)^2$ | $(6+9-6)^2$ | $(9-4+4)^2$ |
| $(1+2+6)^2$ | $(3-2+8)^2$ | $(6-0+3)^2$ | $(9-5+5)^2$ |
| $(1+3+5)^2$ | $(3-3+9)^2$ | $(6-1+4)^2$ | $(9-6+6)^2$ |
| $(1+4+4)^2$ | $(3 \times 1+6)^2$ | $(6-2+5)^2$ | $(9-7+7)^2$ |
| $(1+7+1)^2$ | $(3 \times 2+3)^2$ | $(6-3+6)^2$ | $(9-8+8)^2$ |
| $(1+9+0)^2$ | $(3 \times 3+0)^2$ | $(6-4+7)^2$ | $(9-9+9)^2$ |
| $(1+8-0)^2$ | $(3 \times 4-3)^2$ | $(6-5+8)^2$ | $(9 \div 1+0)^2$ |
| $(1+9-1)^2$ | $(3 \times 5-6)^2$ | $(6-6+9)^2$ | $(9 \div 9+8)^2$ |
| $(1 \times 1+8)^2$ | $(3 \times 6-9)^2$ | $(6 \div 1+3)^2$ | $(0+3)^2 \times 9$ |
| $(1 \times 2+7)^2$ | $(3 \div 1+6)^2$ | $(6 \div 6+8)^2$ | $(1+2)^2 \times 9$ |
| $(1 \times 3+6)^2$ | $(3 \div 3+8)^2$ | $(7+7-5)^2$ | $(3-0)^2 \times 9$ |
| $(1 \times 4+5)^2$ | $(4+5-0)^2$ | $(7+8-6)^2$ | $(4-1)^2 \times 9$ |
| $(1 \times 5+4)^2$ | $(4+6-1)^2$ | $(7+9-7)^2$ | $(5-2)^2 \times 9$ |
| $(1 \times 6+3)^2$ | $(4+7-2)^2$ | $(7-0+2)^2$ | $(6-3)^2 \times 9$ |
| $(1 \times 7+2)^2$ | $(4+8-3)^2$ | $(7-1+3)^2$ | $(7-4)^2 \times 9$ |
| $(1 \times 8+1)^2$ | $(4+9-4)^2$ | $(7-2+4)^2$ | $(8-5)^2 \times 9$ |
| $(1 \times 9+0)^2$ | $(4-0+5)^2$ | $(7-3+5)^2$ | $(9-6)^2 \times 9$ |
| $(1 \times 9 \times 1)^2$ | $(4-1+6)^2$ | $(7-4+6)^2$ | $(3 \div 1)^2 \times 9$ |
| $(1 \div 1+8)^2$ | $(4-2+7)^2$ | $(7-5+7)^2$ | $(9 \div 3)^2 \times 9$ |

FIG. 6. Solutions for 81 with Exponent Card

X-Squared Problem Quiz Sheet – 3 Integers

PEMDAS Operators () $^2$ X ÷ + -

For each of the problems below all 3 Integers and 2 Operators must be used. Parentheses and Exponent are optional, and may be used only once. Operators may be used up to two times.

Using the Integers, create an equation equal to the Solution.

Problem 1.
Integers: 2 5 7
Solution: 10

Problem 2.
Integers: 1 2 8
Solution: 15

Problem 3.
Integers: 0 1 4
Solution: 16

Problem 4.
Integers: 1 2 4
Solution: 20

Problem 5.
Integers: 1 2 3
Solution: 25

Problem 6.
Integers: 3 6 9
Solution: 30

Problem 7.
Integers: 4 5 6
Solution: 35

Problem 8.
Integers: 2 3 4
Solution: 36

Problem 9.
Integers: 1 2 9
Solution: 40

Problem 10.
Integers: 4 5 7
Solution: 45

Problem 11.
Integers: 1 2 9
Solution: 49

Problem 12.
Integers: 2 3 4
Solution: 50

FIG. 7. X-Squared Quiz Sheet for 3 Integers

X-Squared Problem Worksheet – 4 Integers

PEMDAS Operators ( )   $^2$   X   ÷   +   -

For each of the problems below all 4 Integers and 3 Operators must be used. Parentheses and Exponent are optional, and may be used only once. An Operator may be used up to two times.

Using the Integers, create an equation equal to the Solution.

Problem 1.
Integers: 3 4 5 6
Solution: 55

Problem 2.
Integers: 3 4 5 6
Solution: 60

Problem 3.
Integers: 3 4 5 6
Solution: 64

Problem 4.
Integers: 3 4 5 6
Solution: 65

Problem 5.
Integers: 3 4 5 6
Solution: 70

Problem 6.
Integers: 3 4 5 6
Solution: 75

Problem 7.
Integers: 3 4 5 6
Solution: 80

Problem 8.
Integers: 3 4 5 6
Solution: 81

Problem 9.
Integers: 3 4 5 6
Solution: 85

Problem 10.
Integers: 3 4 5 6
Solution: 90

Problem 11.
Integers: 3 4 5 6
Solution: 95

Problem 12.
Integers: 3 4 5 6
Solution: 99

FIG. 8. X-Squared Quiz Sheet for 4 Integers

X-SQUARED MATH CARD GAME

CROSS-REFERENCE

A provisional patent application [63/195,041] was submitted on May 30, 2021. This non-provisional application is a submittal for the same patent content, expounding on the details.

SUMMARY

This patent describes a unique playing card deck and several methods for using the deck. The card deck includes each of the elements of the mathematical Order of Operations[1], the first such composition to ever exist. In addition to Integer cards, the deck includes Parentheses, Exponents, Multiplication, Division, Addition and Subtraction. Collectively, these cover all of the elements of PEMDAS[2]. The concept of PEMDAS is used for mathematical instruction and is widely known throughout the world, yet no playing card composition that covers every element has ever been produced, until now. The card deck is versatile and may be used for math instruction, entertainment games and wagering games. This invention fills a large gap in the market for educational games.

[1]https://www.purplemath.com/modules/orderops.htm
[2]https://www.purplemath.com/modules/orderops.htm

BACKGROUND

Card games and card decks have existed for hundreds of years. Generally speaking, card games have certain utility that is associated with the card deck. It is the composition of the deck that determines the scope of application and the utility of the deck.

There are relatively few card games sold commercially that have been granted patents. This section begins with a reference to patents that have been submitted. It is followed by a list of commercially available card games that do not have patents, but are much more relevant to this X-Squared card game patent application. There are numerous references in the patent database that would fall into the category of math card games. The invention presented here is sufficiently dissimilar that none of the granted patents or patent applications on file are deemed relevant.

US Patent for "2×3" math learning game (U.S. Pat. No. 8,523,573) describes a mathematical education game that utilizes equation cards and answer cards. In this game the equations are pre-defined as they relate to the solution. That patent application refers to a number of granted patents for related games. A review of all of those patents and others within the patent database will reveal that none of them is closely related to the X-Squared card game.

The closest record in the patent database to the X-Squared game is documented in the patent application US20120322559A1, Math Master—A Math Card Game. The proposed game includes both integer and operand cards, similar to X-Squared. It does not, however, include either parentheses cards or exponent cards. The methods of play described in that application are fairly difficult to understand. That patent application has been abandoned.

Other prior art in the public domain involve commercially available card games for which no patent information exists. There are many card games in the commercial market that fall into the category of math card games. Each is unique in its composition, but most of these only include number cards in the game deck. In addition, there are numerous math games in the public domain that utilize a standard deck of playing cards. None of the card games that are publicly available include playing cards that cover all of the elements of PEMDAS.

Target Game

Target is a math game that contains two types of number cards, white cards that contain numbers 1 through 12, and black cards that have specifically designed numbers that serve as the Target. Players try to use 3 of 5 white cards to make equations that equate to a selected Target card using implied[3] mathematical operators. The Target game contains only number cards.

[3]The concept of "implied" is very important because there are no physical operand cards as there are in X-Squared

Krypto

Krypto is a relatively creative card game that involves number cards. Each player is dealt 5 number cards and must use these cards and implied mathematical operations to equate to a solution card. The Krypto game contains only number cards.

Proof!

Proof contains a set of specially selected number cards. Play involves placing 9 cards face up on a table; players try to make mathematical relationships among the cards. Proof! contains only number cards.

24

The 24 game is a family of games where 24 is the solution to every equation. Each 24 card includes 4 numbers printed around the number 24 and players must use those numbers and implied operators to achieve the number 24. The 24 game includes only number cards.

This X-Squared patent application will demonstrate that a card game deck has been created that is so unique in its composition that there is no comparable card deck publicly known, patented or otherwise. The uniqueness of the X-Squared game is in its composition. The collection of playing cards is novel and stands alone, as is clearly and comprehensively explained in this application.

DESCRIPTIONS OF DRAWINGS

FIG. 6. Solutions for 81 with Exponent Card. This drawing illustrates the numerous equations that can be generated to produce a value of 81 when using the Exponent card.

DETAILED DESCRIPTION OF THE INVENTION

1. X-Squared Card Deck Composition[4]

The primary feature of this invention is a physical card deck, novel in its composition. The deck includes all of the requisite elements of the mathematical Order of Operations, as referenced earlier. There are five types of cards in the deck, as illustrated in drawings FIG. 1. The deck includes Integer cards (INT), Operand cards (OP), Solution cards (SOL), Exponents and Parentheses. Only one Parenthesis type of card is required because when transposed it is the same card. The $X^2$ element of each card's background is in gray text. The face text (INT, OP, SOL) is colored.

[4]Please note. Drawings are not to scale. Playing card size is intended to be standard poker or bridge size.

[5]The color of the cards is highly relevant to the deck. The specific card color is included in brackets [ ].

Figure 1:
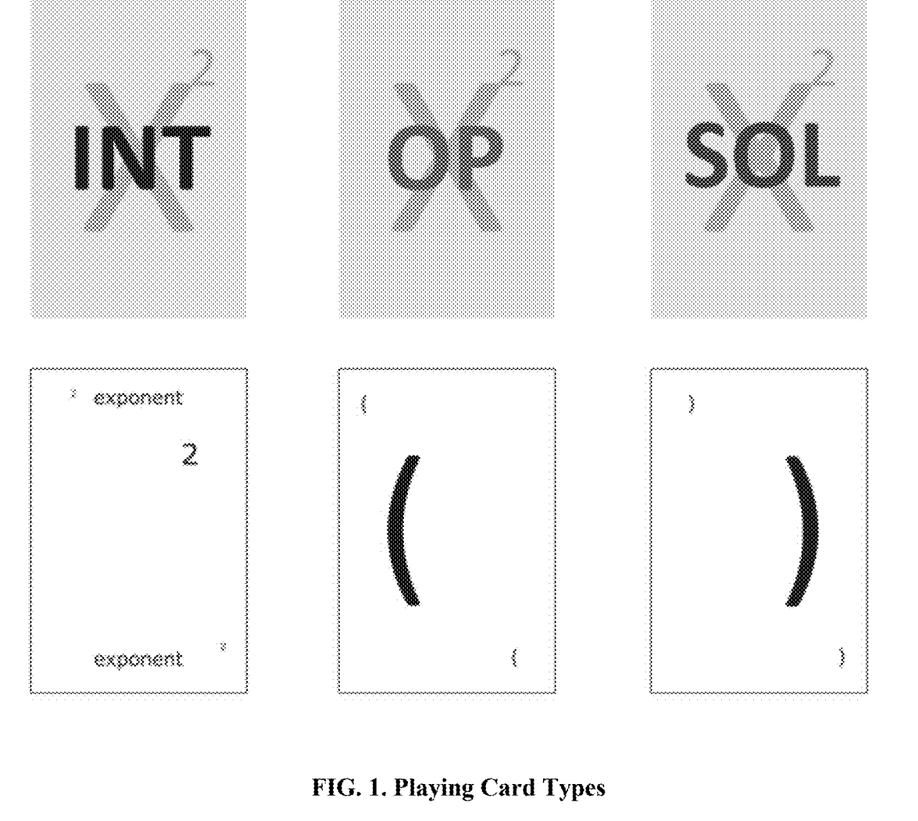
FIG. 1. Playing Card Types. This drawing illustrates the five types of playing cards in the deck.
Figure 2:
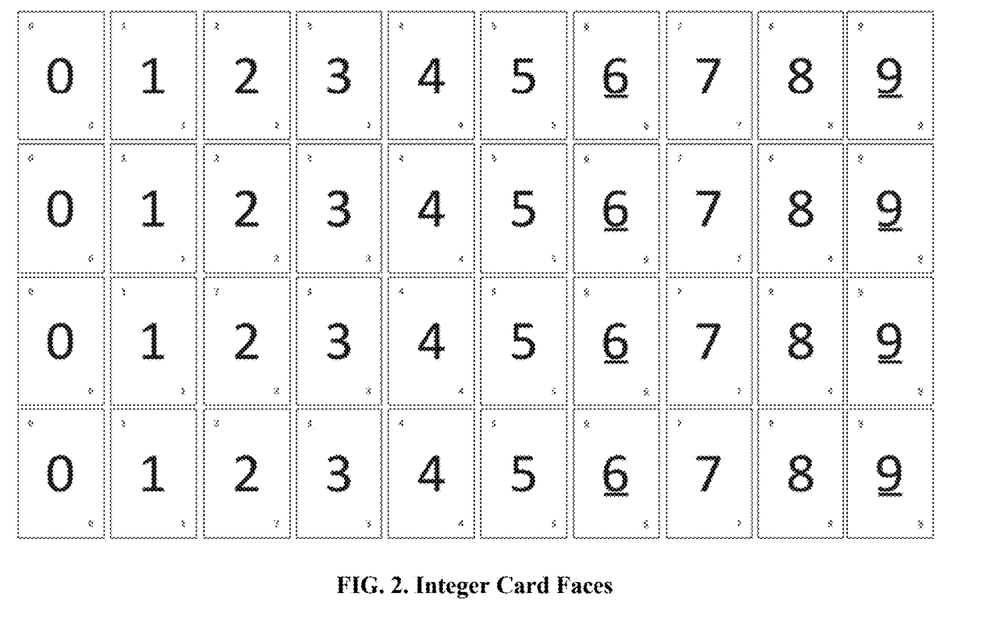
FIG. 2. Integer Card Faces. This drawing illustrates the faces of the 40 Integer cards in the deck.

In FIG. 1 the backs of the cards are shown for Integer, Operand and Solution cards. There are a total of 96 cards. There are 40 Integer cards, 4 each of 0 through 9, as shown in FIG. 2.

Figure 3:
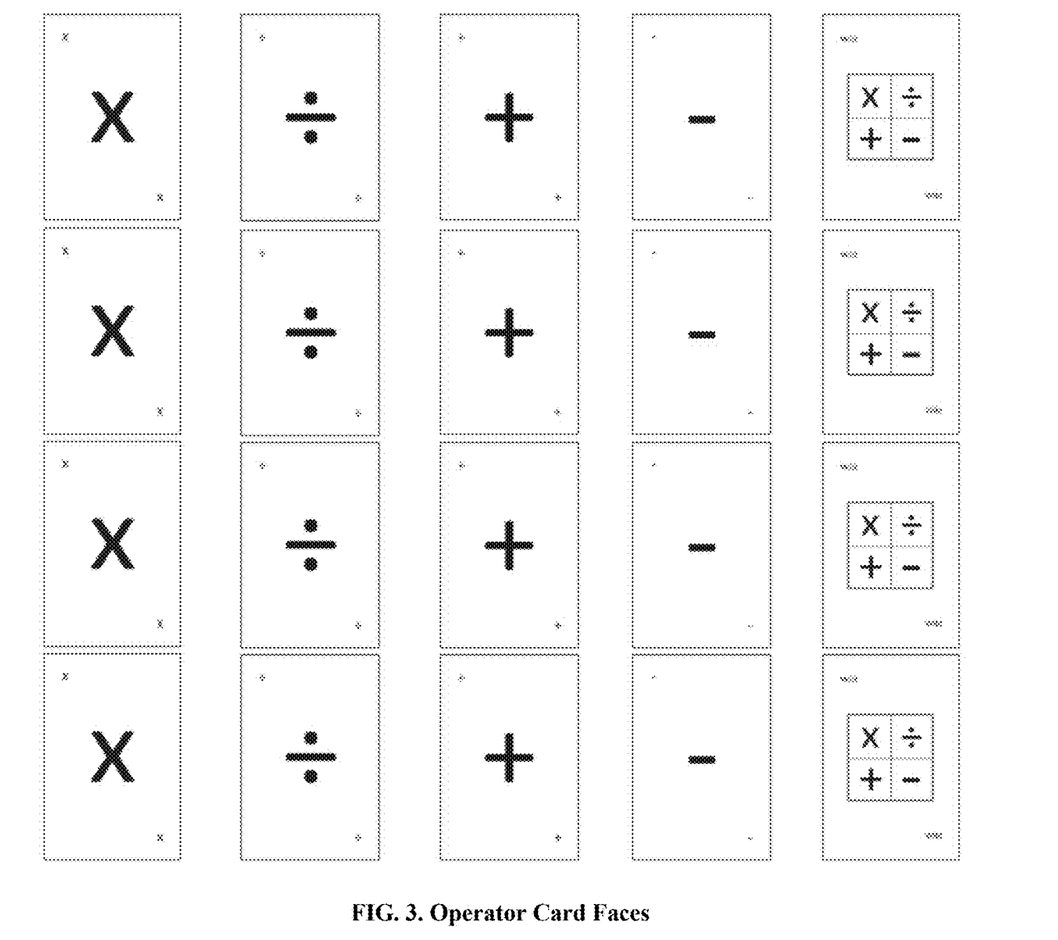
FIG. 3. Operand Card Faces. This drawing illustrates faces of the 20 Operand cards in the deck.

There are 20 Operand cards, 4 each of multiplication, division, addition, subtraction and wild cards that can apply any of the 4 operands. The Wild Operand card is necessary because some equations that use 3 Integer and 2 Operand cards require two of the same Operand. These are illustrated in FIG. 3 of the drawings.

Figure 4:
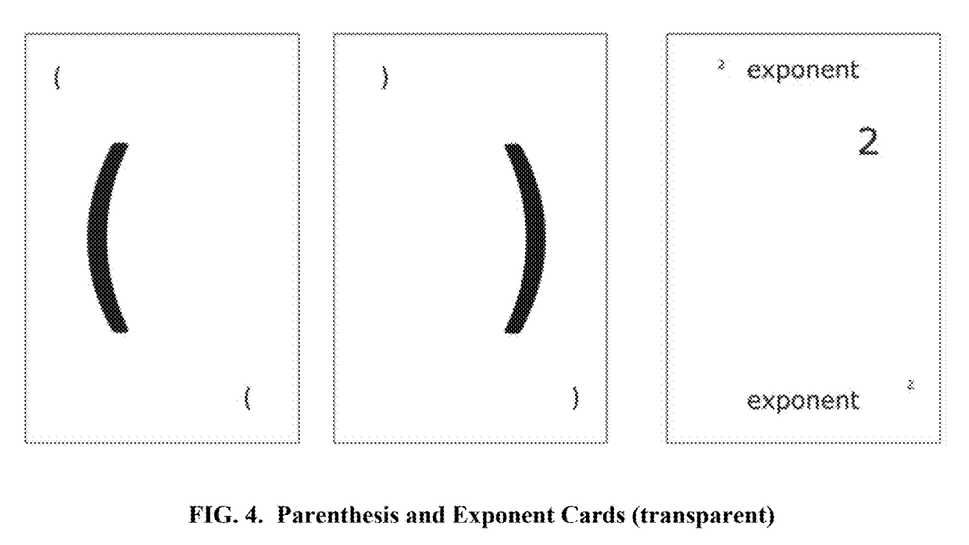
FIG. 4. Parenthesis and Exponent Cards. This drawing illustrates the faces of the 2 Parenthesis and 1 Exponent card. The game itself included 8 Parenthesis and 4 Exponent cards. A key feature of those cards is that they must be transparent to overlay other cards.

There are 8 Parenthesis cards and 4 Exponent cards. Each of these cards are transparent so that they can overlay Integer cards or expressions captured in Parentheses, shown in FIG. 4.

Figure 5:
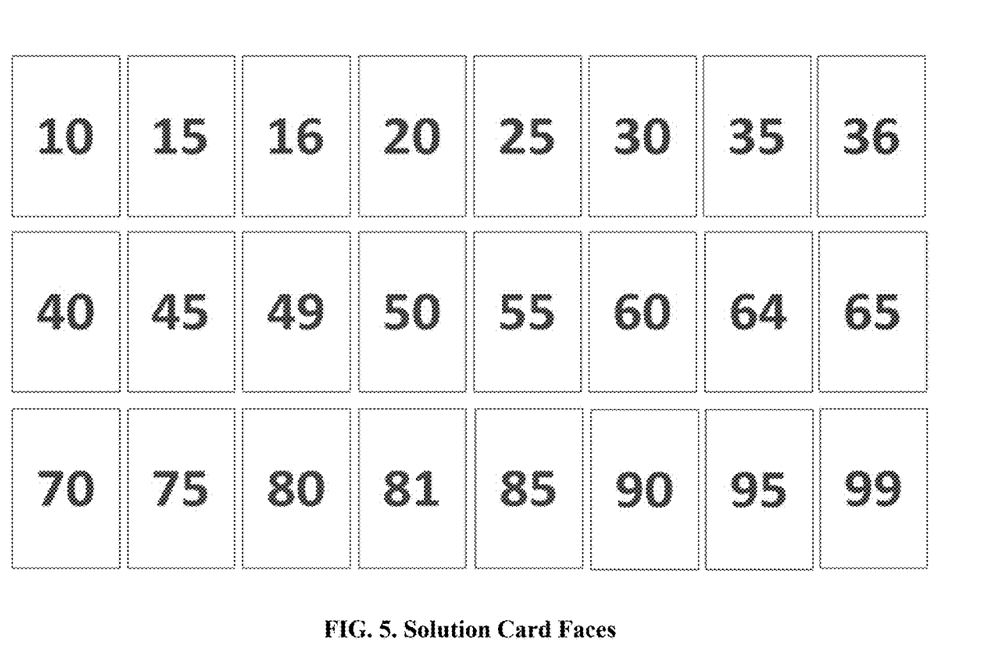
FIG. 5. Solution Card Faces. This drawing illustrates the faces of the 24 Solution cards in the deck.

There are 24 Solution Cards as shown in FIG. 5 of the drawings.

This card deck can be easily produced by a playing card manufacturer. A prototype has already been printed by a card game maker. No further explanation is required on how to manufacture the physical elements of this invention.

The composition of the X-Squared game cards has remarkable implications that may not be obvious to the casual observer, so its relevance is expounded on here, especially the pertinence of the Exponent card. The Integer cards, Operand cards and Parentheses enable mathematical equations to be created that can equate to solutions in the Solution cards. For instance, $(6+3)\times 5=45$. The addition of the Exponent card provides many more options for creating equations equal to the solution.

With the Exponent card, a solution of 45 can be achieved with many more variations than without it. For instance, if the Solution card is 45, an equation of $(5+2)^2-4$ will work, as will $(7-1)^2+9$. The Solution cards have been selected to provide optimal application of the PEMDAS variants.

Another example is offered here to convey the uniqueness and utility of the card deck. Say that players are allowed to use 3 Integer cards with their Operands. Assume that the Solution is 81. Without an Exponent card the possible solution would require one of the Integer cards to be 9. The eight possible solutions without the Exponent card are:

$(0+9)\times 9$
$(1+8)\times 9$
$(2+7)\times 9$
$(3+6)\times 9$
$(4+5)\times 9$
$(3\times 3)\times 9$
$(1\times 9)\times 9$
$(9\div 1)\times 9$ With the Exponent card there are at least 164 additional solutions, as shown in FIG. 6.

2. X-Squared Card Game for Instructional Use

The X-Squared card deck is composed of a unique combination of cards that enables the Order of Operations to be fully explored through a wide variety of games. Each of the games involves the application of Integers, Parentheses, Exponents, Multiplication, Division, Addition and Subtraction to achieve values of Solution cards. It exposes the full range of the elements of PEMDAS.

Students throughout the world learn the application of PEMDAS during middle school. Lessons are typically taught in a linear manner by solving sets of predetermined problems for practice. The typical methods are good for students to get repetition in applying the rules for the Order of Operations. They do not necessarily facilitate, however, a complete comprehension of math facts and Order of Operations. The X-Squared card game provides a different perspective that students are not familiar with and that will significantly broaden their understanding of the relationships among numbers, numerical operations and in particular exponents.

The use of the Exponent card in this game encourages an application of non-linear reasoning in a profound way. Players will never perceive the utilization of exponents in the same way again. Instead of just solving mathematical equations, players create equations that are equal to Solution cards using their mathematical acuity. This requires a higher level of learning. By playing games with X-Squared cards students will inherently gain a much broader understanding of PEMDAS.

A novel element of the X-Squared Card Deck is the inclusion of transparent card stock. This card type is integral to the ability of users to interact with the deck in a seamless and comprehensible manner. Parentheses and exponent cards are transparent so that they can overlay integer cards.

The general use of the X-Squared Card Deck is to create mathematical equations equal to a Solution card. The enumeration of playing card spaces required for a given equation depends on the number of integer cards that are included in a math challenge. For instance, if 4 integer cards are used then a total of 7 card slots is required—4 Integer cards plus 3 operator cards. The card deck composition allows for the use of standard templates to hold the equation cards.

This composition accomplishes two important operational capabilities that would not exist without the transparent cards. First, there is no ambiguity regarding where any cards should be placed when arranging them in a template for creating an equation. Second, the equation reads naturally so that the equation creator and any other observers of the equation can easily and clearly evaluate an equation for correctness. In short, the incorporation of transparent cards into the X-Squared Card Deck make it much easier and more efficient to use and to comprehend than it would if standard card stock was utilized for those elements.

The X-Squared deck is multi-purpose in that it can be used in countless games for education. A few of the games that may be played in a classroom setting are described below.

a. 10 Card X-Squared (Without Exponent)

The simplest form of the game is to play without using the Exponent card. This allows players to practice the Order of Operations with limited complexity.

Assume that there are 16 students. Divide the students into 8 groups of two.

Remove the Solution card 95 from the deck because it is infeasible with no Exponent card. Give each team 10 Integer cards—0 through 9. Also give each team seven of the PEMDAS cards, excluding the Exponent card. The facilitator selects a random Solution card. The teams try to be the first to create an equation using 3 of their Integer cards and 2 Operand cards; Parentheses an Exponent are optional. Whichever team creates the correct equation first gets to take the $1^{st}$ position in the front of the classroom.

The facilitator selects another Solution card randomly. The seven remaining teams try to find an equation. The first to find the correct equation takes the second place in line. This procedure continues until there is only one team left. The facilitator selects a final Solution card. The last team takes as much time as necessary to get a correct equation. Then they take the eighth place in line. With this approach all 8 teams are rewarded in the challenge.

b. 10 Card X-Squared (with Exponent)

The game is played the same way as it is without the Exponent, but here the Exponent is included. In this version the players MUST use the Exponent card in their equations.

c. 7 Card X-Squared Magic Card Combination

There is a 7-card game where 4 Integer cards and 3 Operand cards are used to produce a Solution. This is one of the methods of X-Squared Classic play. While analyzing the 7-card version of the game for solutions to various combinations of integers, a very interesting discovery was made. There are certain combinations of integers that can generate correct equations for all 24 Solution cards. In other words, if a player is dealt one of these special combinations of 4 integers, no matter what Solution card is drawn, it is possible for the player to create an equation that satisfies the solution!

The special combinations of cards are the following:

2 3 4 5
3 4 5 6
4 5 6 7
5 6 7 8
1 3 5 7

The 24 solutions for the 2 3 4 5 integer combination are expressed here to demonstrate this unexpected by-product of the card game.

$3+4+5-2=10$
$2\times3+4+5=15$
$2\times4+3+5=16$
$3^2+2+4+5=20$
$2+3+4\times5=25$
$(4+3-2)^2+5=30$
$(3\times2)^2+4-5=35$
$(2+3-4+5)^2=36$
$(5+3-2)^2+4=40$
$(4+3+2)\times5=45$
$(5-4+3\times2)^2=49$
$(2\times3+4)\times5=50$
$(3^2+4-2)\times5=55$
$(4-2)^2\times3\times5=60$
$(5+4-3+2)^2=64$
$(2^2\times4-3)\times5=65$
$(4+3)\times5\times2=70$
$(4^2+2-3)\times5=75$
$(4+5)^2-3+2=80$
$(5\times2-4+3)^2=81$
$(4^2+3-2)\times5=85$
$(4+2)\times3\times5=90$
$(2^2\times4+3)\times5=95$
$(5\times2)^2-4+3=99$ A classroom game can be created for these combinations that consists of 2 decks.

Again, 16 students are divided into 8 teams of 2 each. Each team is provided each of the 8 PEMDAS cards. They are also given the four Integer cards: 2, 3, 4 and 5. The instructor selects a random Solution card and the players must create an equation that equals the solution. The first team to get the correct equation scores a point.

The instructor selects a second Solution card and again the first team to get the right answer scores a point. This continues through all 24 Solution cards. The instructor should set a time limit (e.g. 5 minutes) on finding the right equation for a given Solution card because some of card values are very challenging to find a solution for. If no team gets an answer in that time limit then no point is scored for that Solution card.

Players who score points could get extra credit toward their grades in the math class.

d. Quiz Sheets

Figure 7:
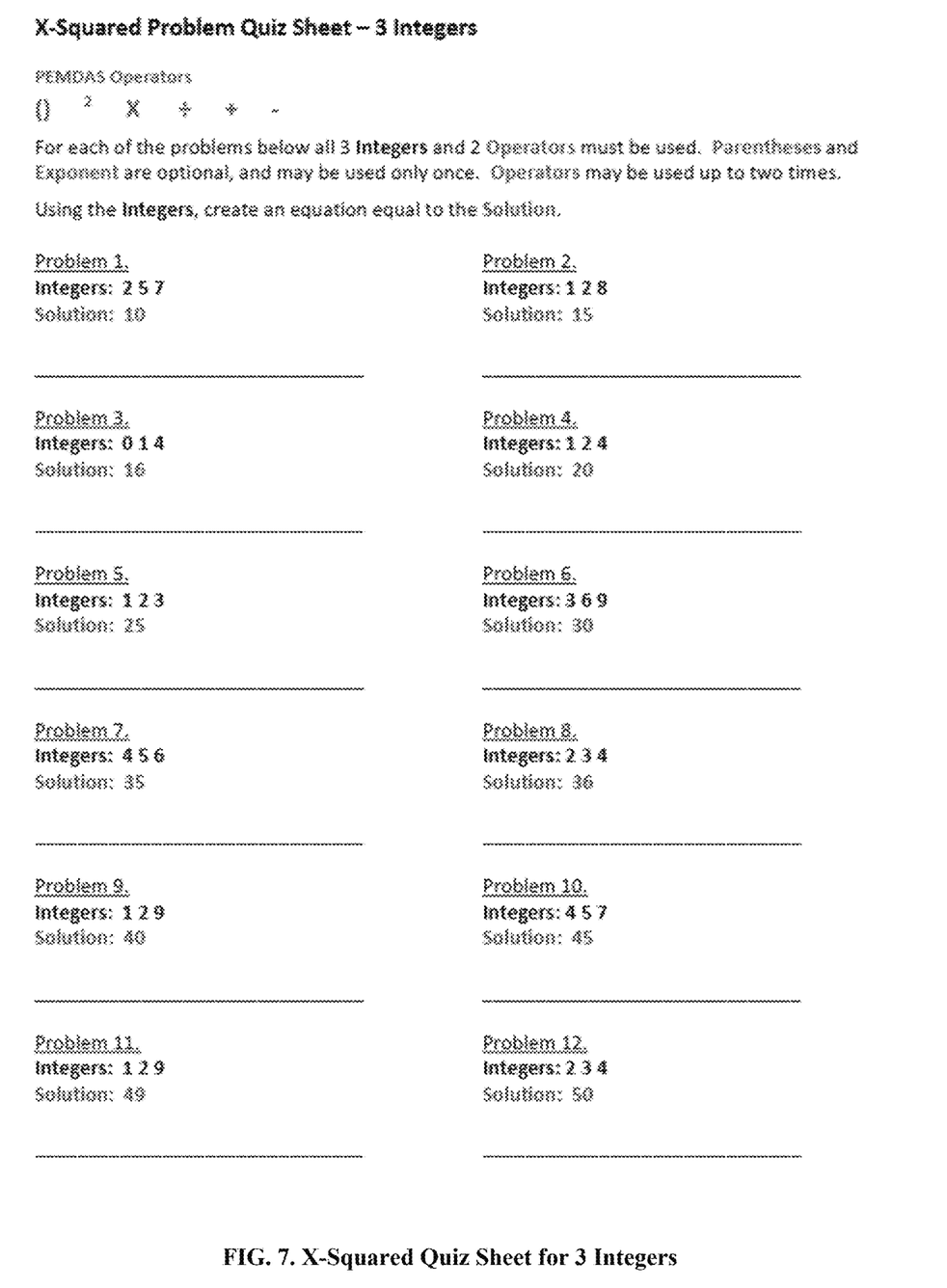
FIG. 7. X-Squared Quiz Sheet for 3 Integers. This drawing represents a sample quiz sheet that utilizes the concepts embedded in the X-Squared game when using 3 Integer cards.
Figure 8:
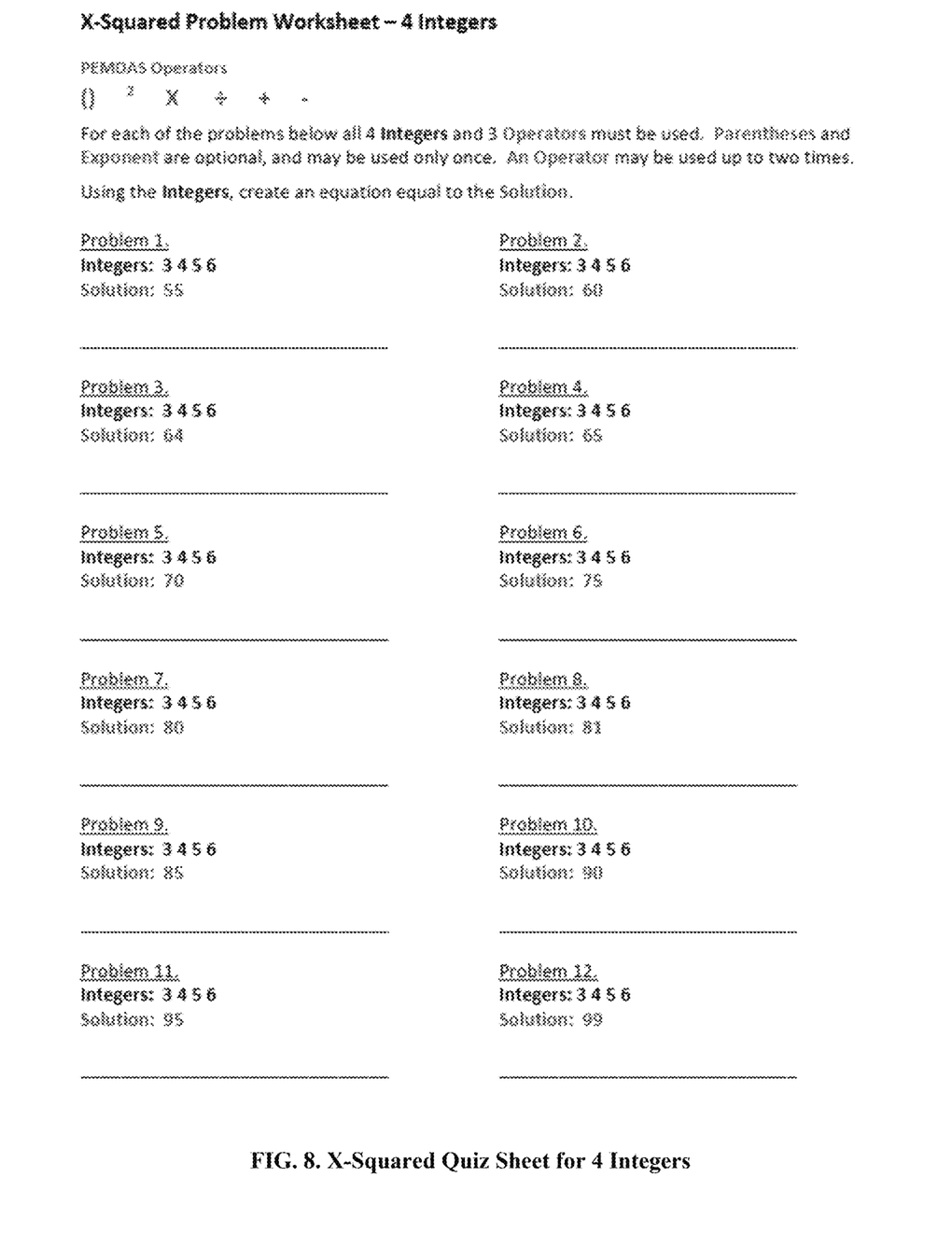
FIG. 8. X-Squared Quiz Sheet for 4 Integers. This drawing represents a sample quiz sheet that utilizes the concepts embedded in the X-Squared game when using 4 Integer cards.

The X-Squared game concepts may be used to construct quiz or practice sheets for the students. After learning how to play the game a math instructor can create problem sheets that use the Integer, Operand and Solution concepts described previously. FIG. 7 illustrates a worksheet with problems that involve 3 Integers and 2 Operands. FIG. 8 illustrates a worksheet with problems that involve 4 Integers and 3 Operands.

The worksheets require students to apply their knowledge of the Order of Operations to create equations. This type of activity enables students to gain a better understanding of relationships among Integers, Operands and Exponents.

3. X-Squared Classic

The X-Squared card deck enables a number of games for entertainment targeted to the general public. The types of games are essentially limitless. Several types are described in the rules in this section.

The objective of the game is to arrange Integer and Operand cards to form an equation that is equal to a Solution card. For instance: $(4+3)\times5=35$. A key element of the game is the use of special Exponent cards.

The $X^2$ math game consists of 96 total cards: 40 Integer (INT) cards, 20 Operand (OP) cards, 24 Solution (SOL) cards, 8 Parenthesis cards and 4 Exponent cards. The Parenthesis and Exponent cards are transparent so they can overlay Integer cards.

A primary strategy of this game revolves around the Exponent cards. This card is used to square the value of the selected Integer or expression. For instance, $7^2=49$, or $(6+4-1)^2=81$. The Exponent card is important because it provides the players with significantly more combinations of possible Solutions than playing without it.

Standard Play—2 to 4 Players

There are two basic forms to this game: Single Draw and Double Draw.

Single Draw

Players hold Parentheses, an Exponent and each type of Operand card each round.

Shuffle the deck of Solution cards; this deck is only shuffled once per Game. Shuffle the deck of Integer cards; repeat each round. Deal 3 Integer cards to each player. Then deal a single Solution card up on the table; all players must try to form an equation to produce the Solution. Turn over the top Integer card and place it next to the Integer deck.

Play starts with the player to the left of the dealer. The player attempts to arrange her Integer and Operator cards to form an equation that is equal to the Solution card. The Parentheses and Exponent are optional. Three Integer and two Operand cards must be used in the solution. The solution must adhere to the universal order of mathematical operations, aka PEMDAS.

If the player cannot form an exact equation, she must draw one Integer card. She may choose the card facing up or select the top card on the deck.

Once drawn, the player attempts to form a correct equation with 3 Integer cards and 2 Operand cards (plus the optional cards). If she can find a correct equation she organizes her cards and exclaims "Done Deal!" and discards the unused card. Then she reveals her solution to her opponents. If it is correct the round is over. If incorrect then she is disqualified from the round. If the player does not have the solution she must discard. The player to her left takes the next turn. That player follows the same procedure, attempting to construct a solution.

Play for each round continues in this manner until someone finds a correct solution, declares "Done Deal!" and shows the correct solution. That player keeps the Solution card and holds it until the end of the Game.

At the end of each round, scores are added to the cumulative score. A new Solution card is selected for each round. Play continues until all of the Solution cards are used, or until a specified point value is reached (e.g. 500) by summing the values of Solution cards held by each player. The player with the most total points on her cards (or to reach the target first) is the Game winner.

Double Draw

Play is similar except that Operand cards are drawn instead of held in this version. Each player is dealt 3 Integer cards and 2 Operand cards.

Players may draw one card from either the Integer deck or Operand deck. Players must discard the same type of card that is drawn. Play continues until one of the players obtains a correct solution, just like in Single Draw.

Alternative Play

Open Solution

This version is played the same way as Single Draw except that instead of just one Solution card being used each round, all Solution cards are placed face up on the table at the beginning of the Game. Players use the three Integer cards dealt to them and their Parentheses, Exponent and Operand cards to find an equation that matches any of the remaining Solution cards. When obtaining a solution, the player takes that card and holds onto it until the Game is over. Play continues until all Solution cards are consumed by the players. At the end of the Game the players add up the values of each of the Solution cards they hold. The player with the most points wins the Game.

7-Card

In this version, seven cards are used instead of five. That is, four Integer cards and three Operand cards must be used in the solution. In Single Draw, four Integer cards are dealt to each player. In Double Draw, four Integer cards and three Operator cards are dealt to each player. Players must use seven cards (four Integer and three Operand) in their equations. Parentheses and Exponent are optional. The 7-Card Double Draw version is a great exercise for advanced players. It requires more thinking, but there are vastly more numerical combinations with four integers.

Community Play—Up to 8 Players

In this version a set of playing cards is placed face up in the middle of a table. It starts with the Parenthesis and Exponent cards. Then the dealer places 3 Integer cards and 2 Operand cards face up (for 5-card play) on the table, along with a Solution card. Then deal 3 Integer cards and 2 Operand cards to each of the players. In this version the players take turns replacing one of the cards in their hands with one on the table. No cards are drawn in community play, just replaced.

Each player must replace one card—either an Integer card or Operand card. When doing so, the player attempts to create an equation that equals the Solution card. Each player may rearrange the cards however she wishes. The play continues until one of the players has created the correct equation. That player gets to keep the Solution card. Play continues until all of the Solution cards are used up.

The community version is good at parties and when first learning how to play.

Parentheses Squared

In this version two Integer cards and one Operand card are dealt to each player (Double Draw). A Solution card is dealt face up; in this game only the 16, 25, 36, 49, 64, and 81 Solution cards are used because the solution must be a perfect square.

Players must use their 3 cards inside of the parentheses so that the expression squared equals the Solution. For instance $(8-1)^2=49$. A new Solution card is selected each round. This version takes relatively little time to play and is good for people who are really "square."

No Excuse

Remove Exponent cards, then the game is simplified to just PMDAS, without the E. Play will take longer as the number of possible solutions it limited. Remove the 95 Solution card because it is infeasible with three Integer cards and no Exponent.

Other Variants

Similar to a standard deck of playing cards, the number of different types of games that could be designed with the X-Squared deck is virtually unlimited. Players are free and encouraged to come up with their own unique versions.

Scoring Variants

In Standard Play there are numerous options for scoring. Summing the values of Solution cards is one way. Simply counting the number of Solution cards is another. A game could be considered complete based on a target number being achieved (e.g. 500 points) or based on a specified number of Solution cards (e.g. 10).

4. X-Squared Poker

The X-Squared card deck enables a number of games for wagering purposes, targeted to the poker playing community. Again, the types of poker games that may be played is without limit. A few types are described here.

X-Squared HoldEm

Two variations of the popular game HoldEm are described in this section: one with Integer hole cards and one with Operand hole cards. In either version players must use 3 Integer cards and 2 Operand cards (with Parentheses and Exponent optional) to produce the best legal hand possible. Only hands with values equal to one of the Solution cards are legal. Therefore, 99 is the best hand, 95 second best, then 90, 85, 81, 80, 75, 70, 65, 64, 60, 55, 50, 49, 45, 40, 36, 35, 30, 25, 20, 16, 15, 10.

Integer HoldEm

Each player is dealt two Integer cards down. Then the players bet, just as in Texas HoldEm. Then 3 Integer cards are placed face up—the Flop. Players bet once again. Next an Operand card is placed face up—the Turn. Players bet once again. Finally, a second Operand card is placed face up—the River. Players place their final bets.

Players reveal their hole cards and try to create the best hand that they can. Players MUST use the two Integer hole cards in producing their hands.

Operator HoldEm

Each player is dealt two Operand cards down. Then the players bet. Then 3 Integer cards are placed face up—the Flop. Players bet once again. Another Integer card is placed face up—the Turn. Players place another round of bets. Finally, a fifth Integer card is placed face up—the River. Players place bets.

Players reveal their hole cards and try to create the best hand that they can. Players MUST use the two Operand cards in their hole and MUST select 3 of the Integer cards to produce their hands. Parentheses and Exponent are optional as always.

Note that for either version of the HoldEm game it is possible that two players could tie for the best hand (e.g. two players with 95 each). If that happens a tie breaker is held: each player is dealt two Integer cards. The integers are multiplied. The player with the highest value from multiplying is the winner.

X-Squared Stud

Two variations of the popular poker game Stud are described in this section: 5-Card Stud and 7-Card Stud. In each version of the game players use 5 cards (3 Integer cards and 2 Operand cards) to make their best hand. Only hands with values equal to one of the Solution cards are legal. Therefore, 99 is the best hand, 95 second best, then 90, 85, 81, 80, 75, 70, 65, 64, 60, etc.

5 Card Stud

Players are dealt 5 cards total. First, one Operand card is dealt face down and one Integer card is dealt face up. Players bet after the first two cards. Then a second Integer card is dealt to each player face up. Players bet one again. Then a third Integer card is dealt face up. Players bet again. Finally, a second Operator card is dealt face down. Players make bets with 5 cards.

7 Card Stud

Players are dealt 7 cards total. First, two Operand cards are dealt face down and one Integer card is dealt face up. Players then bet. A second Integer card is dealt face up. Players bet again. A third Integer card is dealt face up. Players bet again. A fourth Integer card is dealt face up. Players bet again. Finally, a third Operator card is dealt face down. Players place their final bets. Players reveal their cards and create their best 5 card hands.

5. X-Squared Game Kit

An X-Squared Game Kit can be produced by combining the card deck with the set of instructions described in the previous sections. A simple box can be manufactured that holds the 96 playing cards and the set of instructions.

The invention claimed is:

1. A novel deck of mathematics cards promoting creative learning and entertainment associated with math facts and order of operations, comprising 96 bridge-sized cards, including:
   a. 40 integer cards on standard card stock, wherein the integer cards include 4 cards with the number 0 printed thereon, 4 cards with the number 1 printed thereon, 4 cards with the number 2 printed thereon, 4 cards with the number 3 printed thereon, 4 cards with the number 4 printed thereon, 4 cards with the number 5 printed thereon, 4 cards with the number 6 printed thereon, 4 cards with the number 7 printed thereon, 4 cards with the number 8 printed thereon, and 4 cards with the number 9 printed thereon;
   b. 20 operator cards on standard card stock, wherein the operator cards include 4 cards with a multiplication operator printed thereon, 4 cards with a division operator printed thereon, 4 cards with an addition operator printed thereon, 4 cards with a subtraction operator printed thereon and 4 cards with a wild operator printed thereon;
   c. 24 solution cards on standard card stock, each solution card having a solution number printed thereon, wherein the 24 solution numbers include 10, 15, 16, 20, 25, 30, 35, 36, 40, 45, 49, 50, 55, 60, 64, 65, 70, 75, 80, 81, 85, 90, 95 and 99;
   d. 8 parentheses cards printed on transparent card stock, each parentheses card having a parentheses mark printed thereon, wherein each parentheses mark is positioned on the card such that when a parentheses card is placed over an integer card, the number on the integer card is displayed as having an associated parentheses mark; and
   e. 4 exponent cards printed on transparent card stock, each card having an exponent printed thereon, wherein each exponent is positioned on the card such that when an exponent card is placed over an integer card, the number on the integer card is displayed as having an associated exponent.

* * * * *